(12) United States Patent
Ni

(10) Patent No.: US 11,114,096 B2
(45) Date of Patent: Sep. 7, 2021

(54) MITIGATION OF CLIENT DEVICE LATENCY IN RENDERING OF REMOTELY GENERATED AUTOMATED ASSISTANT CONTENT

(71) Applicant: Google LLC, Mountain View, CA (US)

(72) Inventor: Yuzhao Ni, London (GB)

(73) Assignee: GOOGLE LLC, Mountain View, CA (US)

( * ) Notice: Subject to any disclaimer, the term of this patent is extended or adjusted under 35 U.S.C. 154(b) by 210 days.

(21) Appl. No.: 16/341,774

(22) PCT Filed: Mar. 23, 2018

(86) PCT No.: PCT/US2018/024115
§ 371 (c)(1),
(2) Date: Apr. 12, 2019

(87) PCT Pub. No.: WO2019/172943
PCT Pub. Date: Sep. 12, 2019

(65) Prior Publication Data
US 2020/0302923 A1    Sep. 24, 2020

Related U.S. Application Data

(60) Provisional application No. 62/640,391, filed on Mar. 8, 2018.

(51) Int. Cl.
*G10L 19/00*      (2013.01)
*G10L 21/00*      (2013.01)
(Continued)

(52) U.S. Cl.
CPC ............. *G10L 15/22* (2013.01); *G06F 3/165* (2013.01); *G10L 13/00* (2013.01); *G10L 15/26* (2013.01);
(Continued)

(58) Field of Classification Search
None
See application file for complete search history.

(56) References Cited

U.S. PATENT DOCUMENTS 10,198,877 B1 *  2/2019  Maltsev ................. G06F 3/167
2014/0074483 A1   3/2014  Van Os
(Continued)

FOREIGN PATENT DOCUMENTS

WO    WO2015184186 A1    12/2015

OTHER PUBLICATIONS

International Search Report and Written Opinion of PCT Ser. No. PCT/US2018/024115 dated Oct. 30, 2018.
(Continued)

*Primary Examiner* — Satwant K Singh
(74) *Attorney, Agent, or Firm* — Middleton Reutlinger

(57) ABSTRACT

Implementations relate to mitigating client device latency in rendering of remotely generated automated assistant content. Some of those implementations mitigate client device latency between rendering of multiple instances of output that are each based on content that is responsive to a corresponding automated assistant action of a multiple action request. For example, those implementations can reduce latency between rendering of first output that is based on first content responsive to a first automated assistant action of a multiple action request, and second output that is based on second content responsive to a second automated assistant action of the multiple action request.

20 Claims, 5 Drawing Sheets

(51) Int. Cl.
*G10L 15/22* (2006.01)
*G06F 3/16* (2006.01)
*G10L 13/00* (2006.01)
*G10L 15/26* (2006.01)
*G10L 15/30* (2013.01)

(52) U.S. Cl.
CPC ........ *G10L 15/30* (2013.01); *G10L 2015/223* (2013.01)

(56) References Cited

U.S. PATENT DOCUMENTS

| | | | |
|---|---|---|---|
| 2015/0058409 A1* | 2/2015 | Wang | H04L 12/2838 709/203 |
| 2015/0348551 A1* | 12/2015 | Gruber | G06F 40/205 704/235 |
| 2017/0300831 A1 | 10/2017 | Gelfenbeyn et al. | |
| 2018/0330589 A1* | 11/2018 | Horling | G08B 25/008 |
| 2018/0350353 A1* | 12/2018 | Gruber | G10L 15/1815 |
| 2020/0043482 A1* | 2/2020 | Gruber | G10L 15/28 |

OTHER PUBLICATIONS

European Patent Office; Communication Pursuant to Article 94(3) EPC issued in Application No. 18717484.2 15 pages; dated Jun. 14, 2021.

* cited by examiner

MITIGATION OF CLIENT DEVICE LATENCY IN RENDERING OF REMOTELY GENERATED AUTOMATED ASSISTANT CONTENT

BACKGROUND

Humans may engage in human-to-computer dialogs with interactive software applications referred to herein as "automated assistants," (also referred to as "chatbots," "interactive personal assistants," "assistant applications," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may be vocal utterances converted into text and then processed, and/or by typed free form natural language input.

In many cases, logical instances of automated assistants may be implemented across multiple computing devices. For example, a logical instance of an automated assistant may include an automated assistant client installed on a user's mobile phone (or other client device) and one or more cloud-based automated assistant components. The automated assistant client may be configured to provide the user with an automated assistant interface that the user can interact with to engage in a human-to-computer dialog with the automated assistant. For example, the automated assistant client can accept spoken utterances, typed inputs, and/or other inputs of the user, and can graphically and/or audibly render automated assistant responses to those inputs. However, the automated assistant client can still rely on the cloud-based automated assistant component(s) to perform various automated assistant functionalities, such as processing input(s) accepted by the automated assistant client, generating a response to the input(s) (e.g., through interaction with an agent application), etc. Accordingly, in engaging in an automated assistant dialog with a user via a client device, the automated assistant client must often transmit, to the cloud-based automated assistant component(s), data that corresponds to a spoken utterance or other input of a user. Further, the automated assistant client must often wait for responsive content to be received from the cloud-based automated assistant component(s), before it can render the responsive content in response to the input of the user.

Although utilization of the cloud-based components can increase the robustness of the automated assistant through leveraging of the virtually limitless resources of the cloud-based components, it can also present various drawbacks. One such drawback is latency of rendering, by the client device, of content that is responsive to a user input. The latency in rendering can be the result of delays in generating of the content by the cloud-based automated assistant component(s), transmission delay in transmission of the content from the cloud-based component(s) to the client device, and/or transmission delay in transmission of data, which corresponds to user input, from the client device to the cloud-based component(s). Another such drawback is that in performance of multiple automated assistant actions, it can be necessary for the client device to transmit, to the cloud-based components, data for each of the multiple actions. This can result in excessive usage of network resources, especially where the cloud-based automated assistant component(s) are handling a large quantity of requests from a large quantity of disparate automated assistant clients.

SUMMARY

The present disclosure is generally directed to methods, apparatus, and computer-readable media (transitory and non-transitory) for mitigating client device latency in rendering of remotely generated automated assistant content. Implementations are directed to mitigating client device latency between rendering of multiple instances of output that are each based on content that is responsive to a corresponding assistant action of a multiple action request. For example, those implementations can reduce latency between rendering of first output that is based on first content responsive to a first automated assistant action of a multiple action request, and second output that is based on second content responsive to a second automated assistant action of the multiple action request. As used herein, a "multiple action request" is a request that indicates (directly or indirectly) a plurality of discrete actions that can each be performed by an automated assistant (optionally through interaction with a corresponding assistant agent application). A multiple action request can be transmitted by a client device to remote automated assistant component(s), and causes the remote automated assistant component(s) to perform the discrete actions of the multiple action request and to transmit, to the client device, corresponding content for the discrete actions. The client device can then render (e.g., audibly and/or graphically) outputs that correspond to the corresponding content for the discrete actions.

As a working example, a "good morning" multiple action request can be mapped (e.g., in a local and/or remote database), for a user, to the following sequence of automated assistant actions: a "today's local forecast" action, a "today's calendar" action, and a "today's headlines" action. In response to receiving a "good morning" request, a first agent request can be transmitted to a "weather" agent application, where the request specifies the intent of "today's weather" with a value for a "location" slot that corresponds to a current location of the user. A response from the first agent application can be received in response to the first agent request, where the response includes content that indicates today's local weather information. First responsive content can be generated based on the response from the first agent, and the first responsive content transmitted to the client device. For example, the response from the first agent can include text that indicates today's local weather information, and the first responsive content can be the text. As another example, the response from the first agent can include text that indicates today's local weather information, and the first responsive content can be audio data generated by performing text-to-speech processing of the text. The client device can render, in response to receiving the first responsive content, first output that is based on the first responsive content. Further, a second agent request can be transmitted to a "calendar" agent application, where the request specifies the intent of "calendar summary" with a value for a "date range" slot that corresponds to "today", and a value for a "user" that corresponds to an active user of the client device. A response from the second agent application can be received in response to the second agent request, where the response includes content that indicates a summary of the user's calendar for today. Second responsive content can be generated based on the response from the second agent, and the second responsive content transmitted to the client device. Further, a third agent request can be transmitted to a "news" agent application, where the request specifies the intent of "news headlines". A response from the third agent application can be received in response to the second agent request, where the response includes the "news headlines". Third responsive content can be generated based on the response from the third agent, and the third responsive content transmitted to the client device.

A multiple action request can be initiated in response to various cues, such as speaking of one of one or more invocation phrases mapped to the multiple action request (e.g., "good morning" or "morning" for the "good morning" multiple action request), actuating a graphical user interface element for the multiple action request (e.g., a "shortcut" icon for the multiple action request), and/or the occurrence of one or more contextual conditions (e.g., for the "good morning" multiple action request, the occurrence of it being between 7:00 AM and 8:00 AM and the user interacting with a client device that includes an automated assistant interface).

With some prior techniques, when a multiple action request is initiated, a client device transmits, to remote automated assistant component(s), a separate request for each of the multiple actions of the multiple action request. This can cause excessive usage of network resources since, in performing a multiple action request having N actions, N separate requests must be transmitted from the client device to the remote assistant component(s). Additionally or alternatively, with such prior techniques, a "next" action request is not transmitted until the client device has received content for a "current action" and has fully rendered corresponding output. This can cause latency between rendering of output corresponding to a given action, and rendering of output corresponding to a next action. Such latency can lead to the client device being in an increased resource consumption state for a greater duration of time, as the total duration for rendering outputs for the multiple action request is increased as a function of the latency. Moreover, maintaining an open communication channel between a given client device and a remote assistant component for an extended duration may inhibit that component's ability to service other client devices. Reduction of latency may thus facilitate better allocation of network resources.

Implementations disclosed herein can reduce a quantity of transmissions from the client device to remote automated assistant component(s) in performing a multiple action request; can reduce latency between rendering of output corresponding to a given action, and rendering of output corresponding to a next action; and/or can reduce latency in rendering of output corresponding to a given action. In some of those implementations, a multiple action request transmitted by a client device to the remote automated assistant component(s) indicates (directly or indirectly) multiple (e.g., all) of the actions of the multiple action request. For example, the multiple action request can include audio or text for a spoken utterance (e.g., good morning) and an identifier of the user and/or client device. The remote automated assistant component(s) can determine all actions of the multiple action request based on those actions being mapped (in a database accessible to the remote automated assistant component(s)) to: text of the spoken utterance included in the request (or text converted from audio included in the request), and the identifier of the user and/or the client device. The remote automated assistant component(s) can generate and transmit, to the client device, first action content for a first action of the identified multiple actions of the multiple action request. The client device can render first output that corresponds to the first action content.

Further, the remote automated assistant component(s) can generate and transmit, to the client device, at least some second action content for a second action of the multiple actions. The at least some of the second action content can be generated and/or transmitted prior to completion of rendering of the first output (that corresponds to the first action content) by the client device. The client device can locally buffer the at least some of the second action content, thereby enabling the client device to begin rendering second output that corresponds to the at least some of the second action content upon completion of the rendering of the first action content. In these and other manners, latency between the rendering of the first output and the second output is mitigated. Further, both the first action content and the second action content can be received at the client device, and corresponding outputs rendered, in response to the single multiple action request—and without necessitating the client device transmit a separate request for the second action after the first action content has been received.

In some additional or alternative implementations, the remote automated assistant component(s) can initially transmit only part of action content for an action to the client device, then transmit additional part(s) of the action content to the client device. The initially transmitted part of the action content can be initially renderable by the client device, and can optionally be transmitted without the additional part(s) based on determining it is initially renderable. Further, while the client device is rendering the initially transmitted part of the action content, at least one of the additional part(s) can be received and also rendered (immediately, or after completion of the rendering of the initially transmitted part). In these and other manners, the overall latency in rendering the entirety of the action content can be reduced.

As one example, an action can be a "today's calendar summary" action and the remote automated assistant components can generate part of the action content (e.g., through interaction with an agent application) while a second part of the action content is still being generated (or has yet to be generated). For instance, the generated part can be text or audio for a first calendar entry and the second part can be text or audio for a second calendar entry. The first part can be transmitted to the client device for rendering of first output that corresponds to the first part. Further, during the rendering of the first output that corresponds to the first part, the second part can be transmitted to the client device and buffered for rendering of corresponding output upon completion of rendering of the first output. As another example, an action can be a "today's weather" action and the remote automated assistant components can retrieve a graphical template for rendering of a display of "today's weather", where the graphical template includes fixed content, and variable content that is to be "filled in" with yet to be generated specific values. The graphical template can be transmitted to the client device for rendering of the graphical template without the variable content. For instance, the graphical template can be immediately retrievable by the automated assistant components from local memory and can be transmitted before the variable content has even been generated (e.g., due to delays in interfacing with an agent application to generate the variable content). Further, during the rendering off the received graphical template, the variable content can then be transmitted to the client device, and the client device can update the rendering of the graphical template to reflect the later received variable content. For instance, the graphical template transmitted initially can enable rendering of a graphical interface that displays, for example, "today's weather", "High", "Low", and "Precipitation %", but displays no (or "placeholder") actual values for "High", "Low", and "Precipitation %". The variable content subsequently received can then be utilized to update the display to include actual values for "High", "Low", and "Precipitation %".

The above description is provided as an overview of some implementations of the present disclosure. Further description of those implementations, and other implementations, are described in more detail below.

In some implementations, a method, performed by one or more processors of one or more automated assistant server devices remote from a client device, is set forth as including operations such as receiving, via a network interface, a multiple action request transmitted by the client device. The method can further include determining, based on the multiple action request: a first automated assistant action that is indicated by the multiple action request, and a second automated assistant action that is indicated by the multiple action request. The second automated assistant action being disparate from the first automated assistant action. The method can also include generating first action content that is based on the first automated assistant action indicated by the multiple action request; and transmitting, to the client device in response to receiving the multiple action request, the first action content that is based on the first automated assistant action. In response to receiving the transmitted first action content, the client device can render a first output that is based on the first action content. The method can further include, prior to completion of the rendering of the first output by the client device, generating at least part of second action content that is based on the second automated assistant action; and transmitting, to the client device in response to receiving the multiple action request, the at least part of the second action content that is based on the second automated assistant action. The client device can receive the at least part of the second action content prior to completion of the rendering of the first output by the client device. Furthermore, in response to receiving the transmitted at least part of the second action content, the client device can buffer the at least part of the second action content in local memory of the client device. Additionally, in response to completion of rendering of the first output, the client device can accesses the at least part of the second action content buffered in the local memory to render second output that is based on the at least part of the second action content.

Determining the first automated assistant action and the second automated assistant action; generating the first action content; transmitting the first action content; generating the second action content; and transmitting the second action content; can all be performed in response to receiving the multiple action request and can all be performed prior to receiving any other request transmitted by the client device. Generating the at least part of the second action content can include: transmitting, to an agent application, an agent request that is based on the second automated assistant action indicated by the multiple action request; receiving, from the agent application, a response that is responsive to the agent request; and generating the at least part of the second action content based on the response. Transmitting the agent request can cause the agent application to alter a state of a networked peripheral device (e.g., turn on/off a light, adjust temperature of a thermostat, open/close a garage door, lock/unlock a lock). The response can indicate that alteration of the state was successful, and the at least part of the second action content can cause the second output, rendered by the client device, to perceptibly convey to a user of the client device that the alteration of the state was successful. For example, the at least part of the second action content can include audio data that is rendered via a speaker as the second output and that audibly conveys the alteration of the state (as requested by the action of the multiple action request) was successful. The at least part of the second action content can be included in the response. The first output can comprise audio output rendered via one or more speakers of the client device. The first action content can comprise audio data, and the client device can render the first output that is based on the first automated assistant action by driving the one or more speakers based on the audio data. The first action content can comprise text, and the client device can render the first output that is based on the first action content by generating audio data based on processing of the text using a text-to-speech model stored locally on the client device, and providing the generated audio data for rendering of the audio output.

The method can further include establishing a streaming connection with the client device. Transmitting the first action content can be via the streaming connection. Furthermore, transmitting the at least part of the second action content can be via the streaming connection. The multiple action request can comprise audio data that corresponds to a spoken utterance detected at the client device, and the method can further comprise: processing the audio data of the multiple action request to convert the audio data to text. Determining the first automated assistant action and the second automated assistant action based on the multiple action request can comprise: determining the first automated assistant action and the second automated assistant action can be both mapped to: the text, and to an identifier of the client device. Determining the first automated assistant action and the second automated assistant action based on the multiple action request further can comprise determining that the multiple action request dictates that the first automated assistant action is to be performed prior to the second automated assistant action. Furthermore, transmitting the first action content can occur prior to transmitting the at least part of the second action content based on the multiple action request dictating that the first automated assistant action is to be performed immediately prior to the second automated assistant action.

Generating the first action content that is based on the first automated assistant action can comprise: generating a first portion of the first action content prior to completion of generating a second portion of the first action content. Furthermore, transmitting the first action content that is based on the first automated assistant action can comprise: based on determining that the first portion of the first action content is immediately renderable by the client device, transmitting the first portion of the first action content prior to completion of generating the second portion; and transmitting the second portion after completion of generating the second portion. The first portion can comprise a first segment of audio data or text and the second portion can comprise a second segment of audio data or text. The first portion can comprise a graphical interface with at least one display variable, wherein the second portion defines a value for the at least one display variable.

In other implementations, a method is set forth as including operations such as transmitting, by a client device, a multiple action request to a system of one or more automated assistant server devices; receiving, by system, the multiple action request transmitted by the client device; determining, by the system and based on the multiple action request, a first automated assistant action that is indicated by the multiple action request, and a disparate second automated assistant action that is indicated by the multiple action request; generating, by the system, first action content that is based on the first automated assistant action; transmitting, by the system, the first action content that is based on the first action; receiving, by the client device, the first action content; and rendering, by the client device in response to receiving the first action content, first output that is based on the first action content. The method can also include, prior to completion of the rendering of the first output by the client device, generating, by the system, second action content that is based on the second automated assistant action; transmitting, by the system, the second action content that is based on the second automated assistant action; and receiving, by the client device, the second action content. The method can also include buffering, by the client device in local memory of the client device, the second action content; and by the client device in response to completion of the rendering of the first output: rendering second output that is based on the second action content buffered in the local memory.

The first action content can comprise audio data, wherein rendering the first output that is based on the first action content can comprise driving one or more speakers of the client device based on the audio data. The first action content can comprise text, wherein rendering the first output that is based on the first action content can comprise generating audio data based on processing of the text using a text-to-speech model stored locally on the client device, and providing the generated audio data for rendering of the audio output via one or more speakers of the client device. In some implementations, no requests are transmitted by the client device to the system between transmission of the multiple action request and rendering of the second action output. The method can also include, receiving, by the client device via one or more microphones of the client device, a spoken utterance of a user of the client device, wherein transmitting the multiple action request can be in response to receiving the spoken utterance. The multiple action request comprises audio data that is based on the spoken utterance. The method can also include, processing, by the client device, the spoken utterance using one or more speech recognition models stored locally at the client device; determining, by the client device based on the processing, that the spoken utterance corresponds to the multiple action request; wherein transmitting the multiple action request is in response to determining that the spoken utterance corresponds to the multiple action request.

In some implementations, a method implemented by one or more processors is set forth as including operations such as generating a routine that includes multiple different actions. The multiple different actions can include an action that an automated assistant is configured to perform in response to receiving a natural language input at an automated assistant interface of a client device. The operations can also include receiving, from the client device, a request to perform the routine. The multiple different actions can include providing, via the automated assistant interface, first content accessible via a first agent application and second content accessible via a second agent application. The operations can also include initializing retrieval of the first content from the first agent application and the second content via the second agent application. The operations can further include receiving a portion of the first content from the first agent application prior to receiving a portion of the second content from the second agent application; and causing the automated assistant to provide an output stream via the automated assistant interface, wherein the output stream includes the portion of the first content. The operations can also include, when the portion of the second content is received concurrently with the automated assistant providing the output stream that includes the portion of the first content: causing the automated assistant to incorporate the portion of the second content into the output stream prior to the automated assistant completely provisioning the first content.

Causing the automated assistant to incorporate the portion of the second content can include causing the automated assistant to provide a prompt to a user via the automated assistant interface. The method can further include, when the portion of the second content is received concurrently with the automated assistant providing the output stream that includes the portion of the first content: causing the automated assistant to provide a remaining portion of the first content via a separate automated assistant interface of the client device. The automated assistant interface and the separate automated assistant interface correspond to different subsystems of the client device. The method can also include, when the portion of the second content is received concurrently with the automated assistant providing the output stream that includes the portion of the first content: causing the automated assistant to provide a remaining portion of the first content via a graphical interface, and the second content via an audio interface. The second content can include a user prompt, and the method can also include causing the user prompt to be provided by the automated assistant at the automated assistant interface and a remaining portion of the first content to be provided by the automated assistant via a separate automated assistant interface. The output stream can correspond to a series of graphical elements presented at a display interface of the client device, or a series of audio clips provided at an audio interface of the client device. The method can also include tagging a selection of data of the first content in anticipation of fragmenting the data in response to the second content being concurrently received with the automated assistant providing the output stream that includes the portion of the first content.

In other implementations, a method implemented by one or more processors is set forth as including operations such as receiving, at a client device, a request for an automated assistant to perform a routine that includes multiple different actions. The multiple different actions can include an action that the automated assistant is configured to perform in response to receiving an input at an automated assistant interface of the client device. The operations can also include causing a first action and a second action of the multiple different actions to be initialized. Initializing the first action and the second action can include requesting first content and second content to be received by the client device via a content stream. The method can also include receiving a portion of the first content via the content stream, and providing the portion of the first content to a user via the client device. The method can further include, when the first content is being provided to the user and the second content becomes available to the automated assistant: identifying data of the first content to fragment prior to the client device completely provisioning the first content; and causing the second content to be output between provisioning different fragmented portions of the first content.

The method can further include tagging the data of the first content in anticipation of fragmenting the first content in response to receiving the first content via the content stream. The method can also include, when the first content is being provided to the user and the second content becomes available to the automated assistant: incorporating the second content into a buffer of the client device between the different fragmented portions of the first content. The first content or the second content can be accessed via an agent application that is hosted at a separate device from the automated assistant. The first content can correspond to audio data and tagging the data of the first content can include identifying a segment of the first content corresponding to an audio level that is substantially zero or audio content that is empty for a threshold period of time. The second content and the different fragmented portions of the first content can be provided via a single output modality of the client device.

In yet other implementations, a method implemented by one or more processors is set forth as including operations such as receiving, at a server device, a request for an automated assistant to perform a routine that includes multiple different actions. The request can correspond to a user input received at one or more automated assistant interfaces connected to a client device, and the multiple different actions can include at least one action that the automated assistant is configured to perform in response to receiving an input at the client device. The operations can also include determining that a first action of the multiple different actions is associated with a user prompt to be provided via the one or more automated assistant interfaces, and that a second action of the multiple different actions is associated with content to be retrieved by the server device and output via the one or more automated assistant interfaces. The operations can further include generating a request to retrieve the content, and causing, in furtherance of the routine, the client device to provide the user prompt to a user via the one or more automated assistant interfaces. The method can also include, when the client device is providing the user prompt, the user is unresponsive to the user prompt, and the server device receives the content: causing the client device to provide at least a portion of the content associated with the second action via the one or more automated assistant interfaces. The method can further include, when the user is providing a response to the user prompt via a first automated assistant interface of the one or more automated assistant interfaces, and the server device receives the content: causing the client device to provide at least the portion of the content associated with the second action via a second automated assistant interface of the one or more automated assistant interfaces.

The first automated assistant interface can be integral to the client device, and the second automated assistant interface can be a separate client device that is connected to the client device. Both the first automated assistant interface and the second automated assistant interface can be integral to the client device. The first automated assistant interface can be an audio subsystem of the client device and the second automated assistant interface can be a display subsystem of the client device. The method can further include providing the request to retrieve the content to a remote device that is separate from the server device. The remote device can host an agent application that is different than the automated assistant. Causing the client device to provide at least the portion of the content associated with the second action via the one or more automated assistant interfaces can include causing the client device to buffer data corresponding to the user prompt with different data corresponding to the portion of the content.

Other implementations may include a non-transitory computer readable storage medium storing instructions executable by one or more processors (e.g., central processing unit(s) (CPU(s)), graphics processing unit(s) (GPU(s)), and/ or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
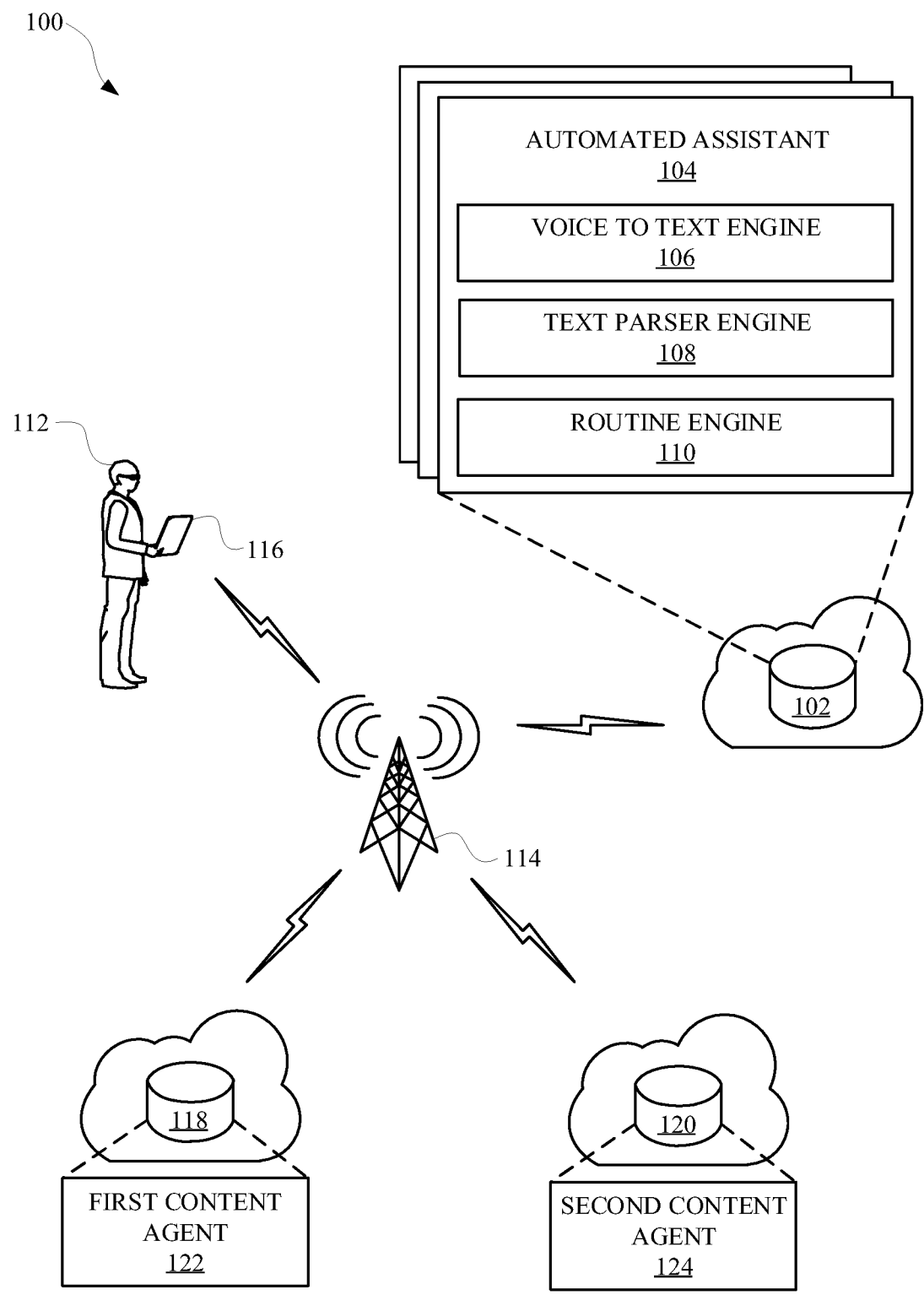
FIG. 1 illustrates a system for using an automated assistant to perform a routine in a manner that mitigates latency in rendering of content for actions that are part of the routine.

The present disclosure is generally directed to methods, apparatus, and computer-readable media (transitory and non-transitory) for mitigating client device latency in rendering of remotely generated automated assistant content. Implementations are directed to mitigating client device latency between rendering of multiple instances of output that are each based on content that is responsive to a corresponding assistant action of a multiple action request. For example, those implementations can reduce latency between rendering of first output that is based on first content responsive to a first automated assistant action of a multiple action request, and second output that is based on second content responsive to a second automated assistant action of the multiple action request.

Some implementations disclosed herein relate seamlessly providing content from a variety of sources through an automated assistant. The content can be provided in response to a request to initialize an automated assistant routine that corresponds to multiple different automated assistant actions. For example, an action of the multiple different actions can correspond to a function of the automated assistant that can otherwise be executed when a user provides a natural language input to an automated assistant interface requesting execution of the function (e.g., "Assistant, tell me the weather."). When a routine includes actions for providing various content to a user, latency can be exhibited by the automated assistant when certain content is not immediately available. Such latency can also delay the provisioning of other content, which may not be provided to the user until certain content is first presented to the user.

In order to mitigate such latency, fragments of content can be selectively incorporated into an output stream provided by an automated assistant. For instance, in response to receiving a request to perform a routine, a server can initialize various actions to be performed in furtherance of the routine. The server can query a first application for providing first content to the user and query a second application for providing second content to the user. The server can organize an output stream for the user to receive based on an order in which the first content and the second content are received. For example, if a portion of the first content is received before any of the second content is received, the server can cause the automated assistant to provide the portion of first content to the user. When the server has received some amount of second content, the output stream can be modified to incorporate the received second content prior to the automated assistant completely providing the entire first content. In other words, while the user is receiving some of the first content via the automated assistant, or other apparatus or application, the second content can be concurrently or sequentially received, prior to the automated assistant providing all of the first content associated with the first action.

In some implementations, content can be separated into fragments that can be provided in the output stream in an order that they are received. For example, first content associated with a first action of a routine can be navigation instructions, and data corresponding to a navigation step of the navigation instructions can be fragmented from the first content. In this way, should any second content associated with a second action of the routine be received during provisioning of the data, a fragment of the second content can be arranged to be presented immediately after the data. In other words, separate data corresponding to the fragment of the second content can be buffered adjacent to the data corresponding to the fragment of the first content. The various fragments of data associated with the routine can be buffered at a client device through which a user is interacting with an automated assistant.

In some implementations, the various fragments of data can be buffered at one or more different client devices. For instance, the first content can correspond to a content stream such as a podcast, and the second content can correspond to information related to an internet of things (IoT) device, such as, but not limited to, a thermostat. A fragment of data (e.g., audio data) of the first content can be provided at the same device (e.g., a cellular device) that the user requested the routine be performed, and a fragment of data (e.g., sensor data) of the second content can be provided at the same device, or a separate device that is accessible to the automated assistant. For instance, the separate device can be the thermostat, a tablet device, and/or any other client device near the user. Alternatively, the device providing the first content through a particular modality, such as an audio interface, can provide the second content through a different modality, such as a display panel. In these and other manners, routines with multiple actions can be rendered with less latency compared to operations that limit provisioning of particular assistant-related content until all of the content has been received.

FIG. 1 illustrates a system 100 for using an automated assistant 104 to perform a multiple action routine in a manner that mitigates latency in rendering of content, by an assistant application of a client device, where the content corresponds to action(s) that are part of the routine. The automated assistant 104 can operate, in part via an assistant application that is provided at one or more client devices, such as a client device 116 (e.g., a cellular phone), and in part via one or more remote computing device(s) 102, such as a server device.

A user 104 can interact with the automated assistant 104 via an assistant interface that is provided via the assistant application of a client device. The assistant interface receives user interface inputs of a user using one or more modalities, and renders user interface outputs using one or more modalities. User interface input modalities include, for example, typed/touch, spoken, and gesture modalities and user interface inputs for the modalities can be received via, for example, microphone(s) of the client device (spoken modality), a touch screen and/or keyboard of the client device (typed modality), a camera of the client device (gesture modality), etc. User interface output modalities include, for example, audible, graphical, and/or haptic, and user interface output for the modalities can be rendered via, for example, speaker(s) of the client device (audible modality), display device(s) of the client device (visual modality), transducer(s) of the client device (haptic modality), etc. For example, a user can provide user interface input to the automated assistant 104 by providing a verbal, textual, gesture, or graphical input to the assistant interface to cause the automated assistant 104 to perform a function (e.g., provide data, control a peripheral device, access an agent, etc.). Responsive content corresponding to the performed function can then be rendered via speaker(s), display screen(s), and/or other user interface output device(s) of the client device. In some implementations, the client device 116 can include a display device, such as a display panel that includes a touch interface for receiving touch inputs and that can also be driven to render automated assistant output. In some implementations, the client device 116 can lack a display device, thereby providing an audible assistant interface output modality, without providing a graphical user interface output modality.

The client device 116 can be in communication with the remote computing device 102 over a network 114, such as the internet. The client device 116 can offload computational tasks to the remote computing device 102 to, for example, conserve computational resources at the client device 116 and/or leverage more robust resources available at the remote computing device 102. For instance, the remote computing device 102 can host the automated assistant 104, and the client device 116 can transmit inputs received at one or more assistant interfaces to the remote computing device 102. However, in some implementations, some aspects of the automated assistant 104 can be implemented on the client device 116. For example, aspects of the automated assistant 104 can be implemented via a local assistant application of the client device 116 and interface with the remote computing device 102 that implements other aspects of the automated assistant 104. For instance, the local assistant application can optionally include one or more local speech-to-text engines, one or more local text-to-speech engines, and/or other local engines that supplement or replace engine(s) of the remote computing device 102. The remote computing device 102 can optionally serve a plurality of users and their associated assistant applications via multiple threads. In implementations where aspects of the automated assistant 104 are implemented via a local assistant application of the client device 116, the local assistant application can be an application that is separate from an operating system of the client device 116 (e.g., installed "on top" of the operating system)—or can alternatively be implemented directly by the operating system of the client device 116 (e.g., considered an application of, but integral with, the operating system).

In some implementations, the remote computing device 102 can perform automatic speech recognition, where audio data provided by the client device 116 is converted to a semantic representation of the audio data (e.g., text). For example, the remote computing device 102 can include a voice to text engine 106 (also referred to as a speech-to-text engine or STT engine) that can process audio data received at an assistant interface to identify the text embodied in the audio data. The process for converting the audio data to text can include a speech recognition algorithm, which can employ neural networks and/or statistical models for identifying groups of audio data corresponding to words or phrases. As one non-limiting example, audio data can be processed using one or more trained acoustic models (e.g., a neural network model with one or more long short-term (LSTM) layers) to generate phones and/or phonemes that are present in the audio data, and the phones and/or phonemes analyzed to generate text that corresponds to the phones and/or phonemes. The text converted from the audio data can be parsed by a text parser engine 108 and made available to the automated assistant 104 as textual data that can be used to generate and/or identify command phrases from the user 112 and/or a third party application.

In some implementations, a user 112 can initialize a routine through an assistant interface of the client device 116 in order to cause the automated assistant 104 to perform a variety of different actions. For instance, the user 112 can provide a natural language input to the assistant interface, and the input can be processed by a routine engine 110 that is accessible to, or integral to, the automated assistant 104. The routine engine 110 can compare the input to a data storage of entries that map routine names to corresponding actions. For example, a routine can correspond to a first action of retrieving first content from a first content agent 122 that is accessible through a remote device 118, a second action of retrieving second content from a second content agent 124 that is accessible through a remote device 120. The first content can be, but is not limited to, audio data such as a podcast and the second content can be, but is not limited to, weather data. The first content and the second content can be retrieved by the automated assistant in response to the user 112 providing an input command such as, "Good morning." Alternatively, the automated assistant can perform a routine associated with a set of actions in response to a user tapping on a graphical user interface element, such as an icon labeled "Good morning." Alternatively, the automated assistant can perform a routine associated with a set of actions in response to the user performing a gesture, with or without a particular context being taken into consideration by the automated assistant. For example, the gesture can include, but is not limited to, a hand wave or a physical motion of the user near an assistant device, and/or the context can include a time of day, a location, and/or a recent action performed by the automated assistant. In some implementations, the automated assistant can perform a routine without explicit user interface engagement from the user. For instance, the automated assistant can perform a routine in response to a client device detecting a presence of a user within a particular time period or detecting a voice of the user within a particular time period (e.g., performing a "good morning" routine in response to detecting a presence of the user between 7-9 AM).

In response to receiving the input command, the automated assistant 104 can request the first content from the first content agent 122 and the second content from the second content agent 124. The automated assistant 104 can provide a response to the user 112 according to the content that is provided back to the automated assistant 104 first. For example, if at least a portion of the first content is provided back to the automated assistant 104 before a portion of the second content is provided back to the automated assistant 104, the portion of the first content can be provided to the client device 116 to be buffered. Subsequently, if the automated assistant 104 receives a portion of the second content when the first portion is being provided to the user 112 at the client device 116, the automated assistant 104 can cause the client device 116 to buffer the received portion of the second content. As a result, the user 112 can receive the portion of the first content and subsequently receive the portion of the second content, without having to wait for all of the first content to be received by the automated assistant 104 and/or the remote device 102. In other words, the automated assistant 104 does not necessarily wait for the first action to be complete before providing results of the second action. Rather, the automated assistant 104 can provide content associated with the first action and the second action as the content is received, by creating a content stream between the remote device 102 and the client device 116.

In some implementations, when the second content is received while the automated assistant 104 is providing the first content through a first assistant interface of the client device 116, such as an audio subsystem, the second content can be provided through a second assistant interface of the client device 116, such as a display subsystem. In this way, latency that would otherwise be exhibited can be mitigated by allowing the first content and the second content to be presented simultaneously through different modalities of the client device 116.

In some implementations, when the second content is received while the automated assistant 104 is providing the first content through a display subsystem, the second content can be also be provided through the display subsystem at a different location. For instance, a portion of the first content can be presented at a graphical user interface of the client device 116 when the portion of the first content is received. If a portion of the second content is received simultaneous to the portion of the first content being displayed at the graphical user interface, the portion of the second content can be displayed at a different location of the graphical user interface, simultaneous to the portion of the first content being displayed.

Each of the first content and the second content can be flagged by the remote device that is tasked with retrieving the content as being associated with a particular modality. In this way, when the client device received the content, the client device can determine whether to present the content simultaneously, according to whether first content and the second content correspond to different modalities. Alternatively, the client device can determine the modality for each of the first content and the second content without needing the remote device to flag each particular modality. In some implementations, the remote device can flag particular content as suitable for simultaneous presentation when content associated with the same modality is retrieved by the remote device in furtherance of a routine. For instance, when the automated assistant is requested to perform a routine that includes two actions associated with providing displayed content, the remote device can retrieve the content for each action and flag them as suitable for simultaneous display. Content that is suitable for simultaneous presentation can include content that can be content that is merely a notification of a status of a device (e.g., "Your air conditioner is running."), and/or any other status identifier that can be displayed simultaneous with other, more detailed content.

Figure 2:
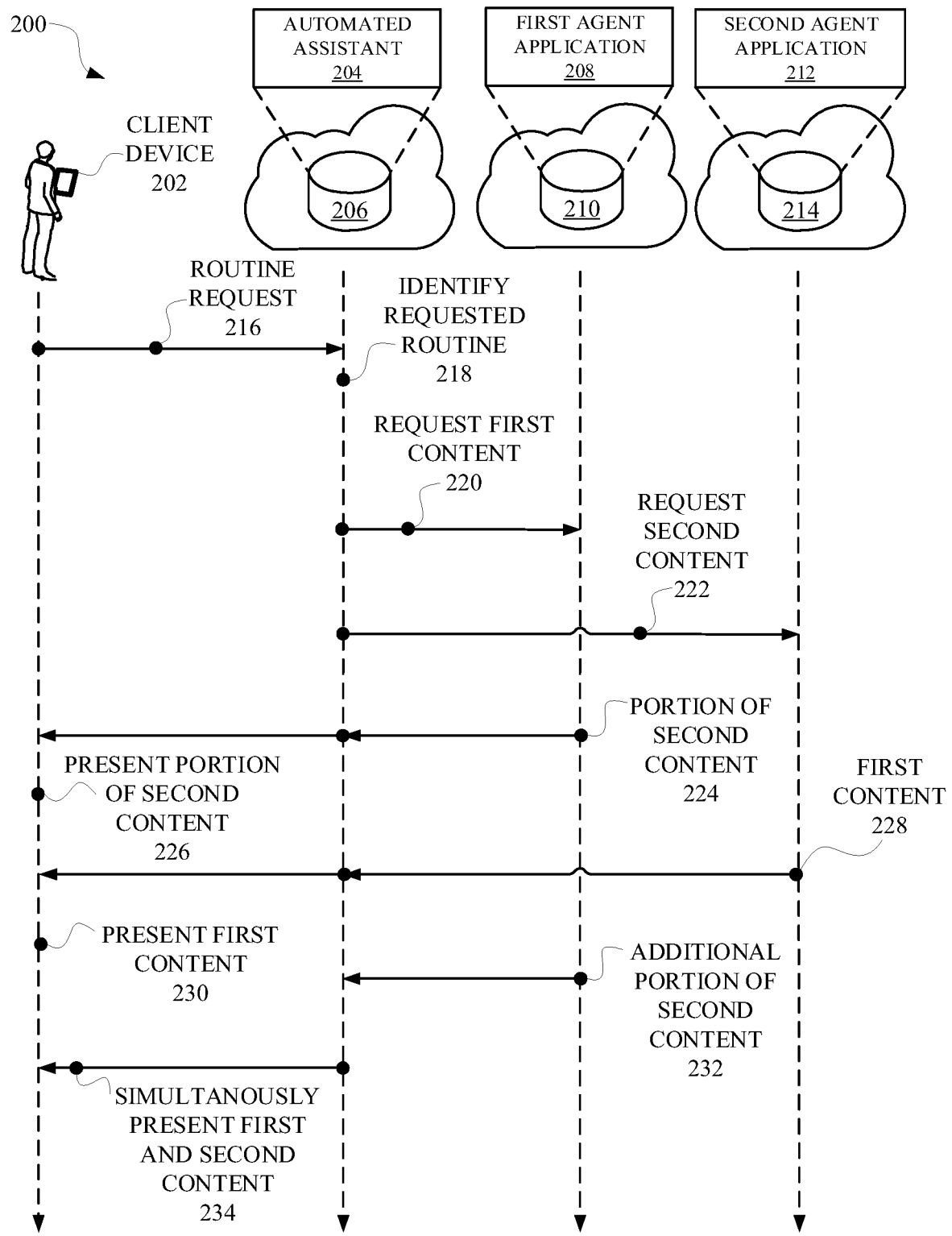
FIG. 2 illustrates a state diagram that provides an example of how an automated assistant can provide portions of content associated with a routine as an output stream.

FIG. 2 illustrates a state diagram 200 that provides an example of how an automated assistant 210 can provide content, corresponding to a routine, as an output stream in order to mitigate latency during performance of the routine. For instance, as provided in FIG. 2, a user can invoke an automated assistant 204 through an automated assistant interface of a client device 202. The user can request a routine be performed by the automated assistant 204, by causing the client device 202 to send a routine request 216 to a remote device 206 that hosts at least a portion of the automated assistant 204. A routine request can be data that is transmitted between devices, such as a client device and a remote device, and the routine request can embody at least a portion of a request for a routine to be performed. The routine request can be audio data corresponding to the user speaking a command to the client device directing the automated assistant to perform a particular routine. The audio data can then be processed by the remote device to identify the routine with which the user was referring to. Identifying the routine can include mapping a textual rendering of the audio data to 1 through N possible actions or one or more routines X that can be performed by the automated assistant. Alternatively, a spoken command can be processed locally at the client device, and a phrase resulting from the processing can be provided to the remote device for initializing a particular routine. For example, the phrase can identify a particular command, action(s), or routine, such as "perform actions 1-N" or "perform routine X."

In response to receiving the routine request 216, the automated assistant 204 can identify the requested routine 218 from one or more different routines stored at the remote device 206. Each routine can correspond to or more different actions that can be performed by the automated assistant 204 and/or any other application or device that is accessible to the automated assistant 204. For example, a routine can be initialized when the user provides a command to the assistant interface, such as "Tell me about my day." The command can correspond to a routine that includes actions such as reciting calendar data to the user via the client device 202 and providing weather data to the user. The calendar data can be retrieved from a first agent application 208 hosted at a remote device 210, and the weather data can be retrieved from a second agent application 212 hosted at a remote device 214.

When the automated assistant 204 has identified the routine requested by the user, the automated assistant 204 can identify the actions associated with the routine and thereafter generate request for retrieving data for completing the actions. For example, when the automated assistant 204 receives the command, "Tell me about my day," the automated assistant 204 can cause a request for first content 222 be provided to the first agent application 208, and a request for second content 222 to be provided to the second agent application 212. Because the first agent application 118 and/or the second agent application 212 maybe handling other requests from other devices or applications, each of the first agent application 208 and the second agent application 212 may respond at different times. In order to mitigate latency between the time of the routine request 216 and a response from the automated assistant 204, the automated assistant 204 can provide an output stream to the client device 202 that is agnostic with respect to the order with which the request for content is transmitted or generated.

For example, although the request for first content 220 was provided before the request for second contents 222, a portion of second content 224 may be received first by the automated assistant 204. In response to receiving the portion of second content 224, the automated assistant 204 can cause the client device 202 to present the portion of second content 226. For example, the portion of second content can be a portion of weather data that is provided by a weather application. Instead of waiting for all the second content to be received by the automated assistant 204, the automated assistant 204 can process the portion of the second content to determine whether there is enough content to be presented by the client device 202. For example, the second content can be processed to identify breakpoints, pauses, empty sets, and any other identifier that can indicate a portion of data that is suitable for fragmenting. When the portion of second content corresponds to audio data, the audio data can be processed to determine whether there are pauses or portions with a threshold amount of noise, in order to identify where to fragment the second content.

Before, during, or after the portion of second content 226 has been presented at the client device 202, the automated assistant 204 can receive the first content 228. In some implementations, the first content 228 can be channeled into an output stream that is provided between the automated assistant 204 and the client device 202. For example, in response to receiving the first content 228, the automated assistant 204 can cause the client device 202 to present the first content 230 between fragments of the second content. As a result, the user can perceive the second content and the first content being sequentially provided through the same modality available at the client device 202. Alternatively, if the second content is being provided through a first modality when the first content is received by the automated assistant 204, the first content 228 can be presented simultaneously with the second content but at a second modality that is different than the first modality. For example, the portion of second content can be weather data that is graphically presented at the client device 202 when the first content 228 is received by the client device 202. The automated assisted 204 can determine that the portion of second content is being provided through a graphical interface and, in response, designate the first content 228 to be presented through an audio subsystem of the client device 202.

As the client device 202 is presenting the first content 230, the automated assistant 204 can receive an additional portion of the second content 232. In response to receiving the additional portion of second content 232, the automated assistant 204 can cause the client device 202 to simultaneously present the first content and the second content 234. The first content and the second content can be simultaneously presented through the same modality or different modalities of the client device 202. In some implementations, the automated assistant 204 can access one or more devices that are different than the client device 202 but are associated with the user, and cause the first content and the second content to be provided simultaneously at multiple different devices.

If the user provides additional requests during the output stream from the automated assistant 204, the automated assistant 204 can pause the output stream in order to receive the requests. When the request has been completely received, the automated assistant 204 can resume the output stream. In other words, in response to receiving an intermediate request, the automated assistant 204 can cause the client device 202 to provide any remaining contents of a buffer of the client device 202 to the user in furtherance of the routine. In some implementations, in response to receiving an input from the user during the output stream, the automated assistant 204 can determine the modality through which the user provided the input. The automated assistant 204 can then identify a different modality that is currently available at the client device 202, and cause the output stream to be continued through the different modality while the automated assistant 204 is receiving the input from the user. For example, if the user was receiving the calendar data and the weather data through an audio subsystem of the client device 202, and the user elects to provide an input through the audio subsystem (e.g., a spoken utterance of "Could you message my brother?"), the automated assistant can determine that a display subsystem of the client device 202 is available. The automated assistant 204 can make this determination while receiving the input from the user, and cause the client device 202 to present any remaining portions of the calendar data and the weather data at the display subsystem of the client device 202. If the routine is not complete when the user has completed providing the input to the automated assistant 204, the display subsystem can return to displaying what it was displaying before the user provided the input, and/or the automated assistant can cause the audio subsystem to continue providing the calendar data and the weather data. If the routine is completed during a time when the user is providing the input to the automated assistant 204, the weather data and the calendar data can continue being displayed at the display subsystem until the user acknowledges the data or otherwise provides an input to the client device 202.

In some implementations, the requested routine can be associated with a rule or limitation that requires the first content, associated with the first action, be completely rendered or otherwise provided to the user before the second content, associated with the second action, is rendered or otherwise provided to the user. For example, the routine can be initialized in response to the user providing a natural language input, such as speaking the phrase, "Good morning." Additionally, the routine can include a first action of providing calendar data to a user, and a second action for providing a radio stream to the user. However, the routine can be stored with a requirement or limitation that the first content be provided in its entirety before the second content can be provided to the user. In order to mitigate latency that can be exhibited between the first content being provided to the user and the second content being provided to the user, the second content can be buffered by the client device while the client device is providing the first content.

For instance, with respect to the aforementioned example, the automated assistant can receive a request from a user to perform the routine, and generate a request to retrieve the first content and the second content. As illustrated in FIG. 2, the client device can receive a portion of the second content before any of the first content is received. However, because the routine requires the first content be provided in its entirety before the second content is provided, the portion of the second content received at the client device can be buffered in a memory of the client device. Thereafter, when the first content is received by the client device, the client device can prioritize the first content over the second content, thereby satisfying the requirement of the routine to completely provide the first content before providing the second content. When the first content has been completely provided in its entirety, the client device can begin rendering the previously received portion of the second content that is buffered. Furthermore, the automated assistant can request more of the second content when the portion of the second content is being rendered from the memory, if more of the second content is available. In these and other manners, latency can be mitigated between the rendering of the first content and the second content. In some implementations, if more of the second content is available, the client device can receive more of the second content without requesting it. Rather, the client device can provide a streaming channel through which the second content is automatically rendered as it is being provided, in order to further mitigate latency.

Figure 3:
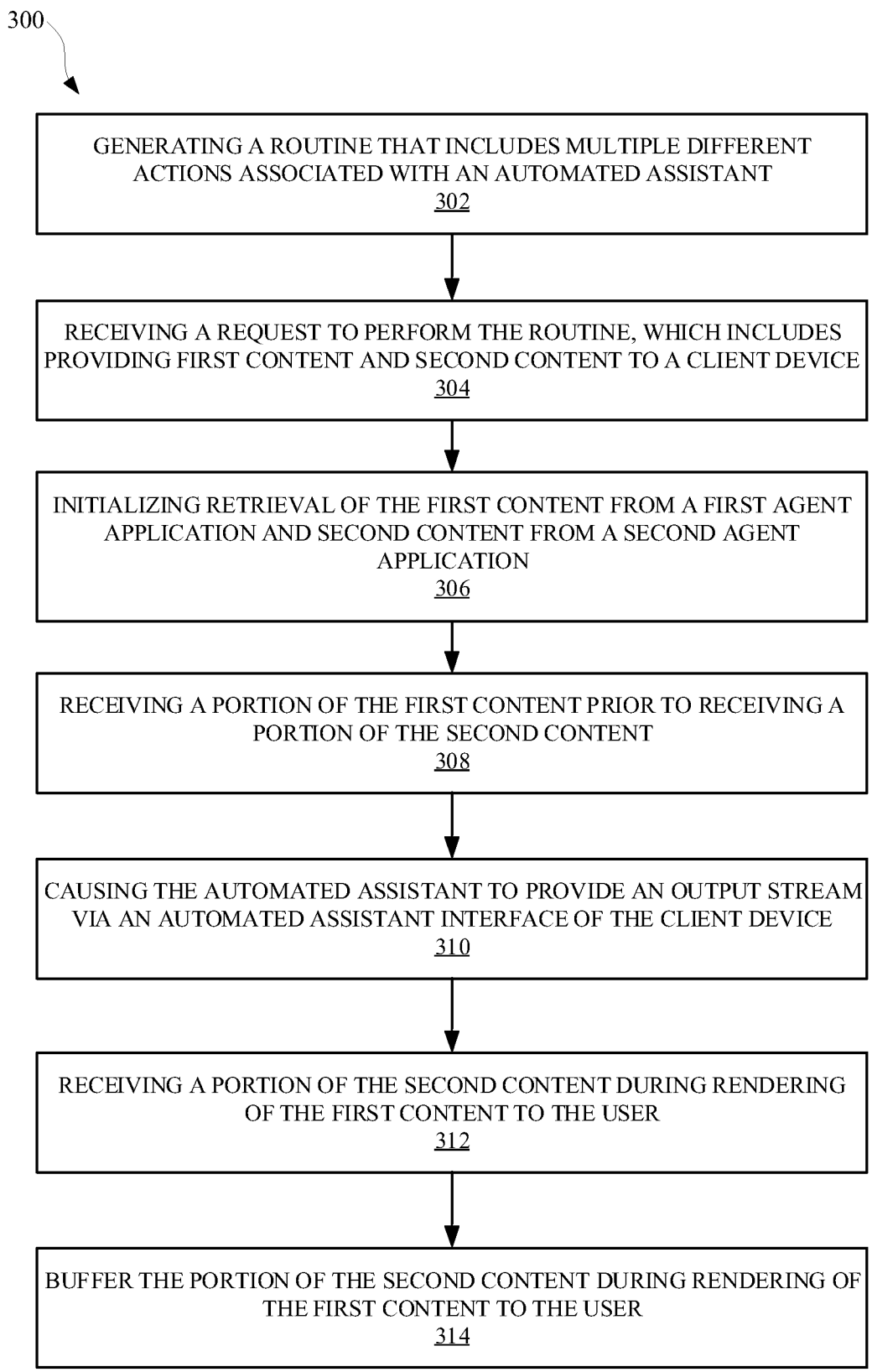
FIG. 3 illustrates a method for simultaneously buffering content that is associated with different actions of a multiple action automated assistant routine.

FIG. 3 illustrates a method 300 for simultaneously buffering content that is associated with different actions of a routine, which is to be performed by an automated assistant. The method 300 can be performed by one or more applications, devices, and/or any other system capable of interacting with an automated assistant. The method 300 can include an operation 302 of generating a routine that includes multiple different actions associated with an automated assistant. The operation 302 of generating the routine can be initialized by a user who is requesting that the multiple different actions be combined into a routine that can be performed when the automated assistant is invoked by the user. Alternatively, the operation 302 of generating the routine can be performed in response to the automated assistant accessing a remote device, such as a server, for identifying a particular routine. Each action of the multiple different actions can be perform directly or indirectly by the automated assistant. For example, an action of the routine can include accessing data that is available to an automated assistant application that is hosted at least partially by a client device being operated by a user. Additionally, an action of the routine can include retrieving certain data from one or more remote devices and causing the automated assistant to present the data to the user via one or more assistant interfaces of the client device being operated by the user.

The method 300 can further include an operation 304 of receiving a request to perform the routine, which can include providing first content and second content to the client device. The request can be provided as a natural language input to an assistant interface of the client device. The routine can be, for example, used to prepare a residence of the user for company. Therefore, the first content can be music retrieved from a first server device, and the second content can be a listing of available movies that can be streamed at the client device. The input command for initializing the routine can be, for example, "Prepare to party," and in response to receiving the input command, the automated assistant can generate requests for the first content and the second content.

The method 300 can further include an operation 306 of initializing retrieval of the first content from a first agent application and second content from a second agent application. An agent application can refer to a first party ("1P") agent application (i.e., an agent application controlled by the same party that controls the automated assistant) or a third party (3P) agent application (i.e., an agent application controlled by a party that is separate from the party that controls the automated assistant). Each agent application can be configured to receive one or more particular types of requests, and generate a corresponding response that is responsive to a request. For example, a request can be transmitted to the agent application via an application programming interface (API) and can identify an intent (e.g., an action to be performed by the agent application) along with value(s) for slot(s) of the intent, where each of the value(s) dictates a parameter for performing the action indicated by the intent. For instance, the first agent application can be a music streaming application and the second agent application can be a video streaming application. When each of the first agent application and the second agent application receive a request for respective content, each agent application can exhibit some amount of latency because of network traffic. Regardless, the earliest content received from either of the first agent application or the second agent application can be provided by the automated assistant to the user. In other words, regardless of which content was requested first in time or is first with respect to the routine, the earliest content received by the automated assistant can be provided to the user, even if the received content is not completely received yet in its entirety. Thereafter, if other content is received after some initial content is received, the other content can be buffered simultaneous to the initial content being rendered to the user, regardless of whether the initial content or other content are labeled first with respect to the routine.

The method 300 can further include an operation 308 of receiving a portion of the first content prior to receiving a portion of the second content. The portion of the first content can be, for example, a portion of audio data corresponding to a stream of music from the first agent application. Because the second agent application took longer to generate a response to the request for content, the first agent application was able to provide some amount of the first content to the automated assistant for further processing.

The method 300 can additionally include an operation 310 of causing the automated assistant to provide an output stream via an automated assistant interface of the client device. The output stream can be a connection between the automated assistant and the client device through which content associated with the routine can be provided as it is received by the automated assistant. For example, the automated assistant can be at least partially hosted at a remote server device, and the remote server device can be connected to the client device over a network such as the internet. In response to the automated assistant receiving the portion of the first content, the portion of the first content can be provided to the client device through the output stream.

The method 300 can further include an operation 312 of receiving a portion of the second content during rendering of the first content to the user. For instance, rendering of the first content can include causing the first content to be output through an audio system of the client device. Therefore, the portion of the second content can be received when the first content is being output by the audio system of the client device. The method 300 can further include an operation 314 of buffering the portion of the second content during rendering of the first content to the user. For instance, when the first content is being provided as an output to the user through a subsystem of the client device, the received portion of the second content can be concurrently buffered at the client device. In this way, any latency that would otherwise be exhibited when the client device is switching between outputting the first content and the second content would be mitigated by having the second content buffered at the client device.

Figure 4:
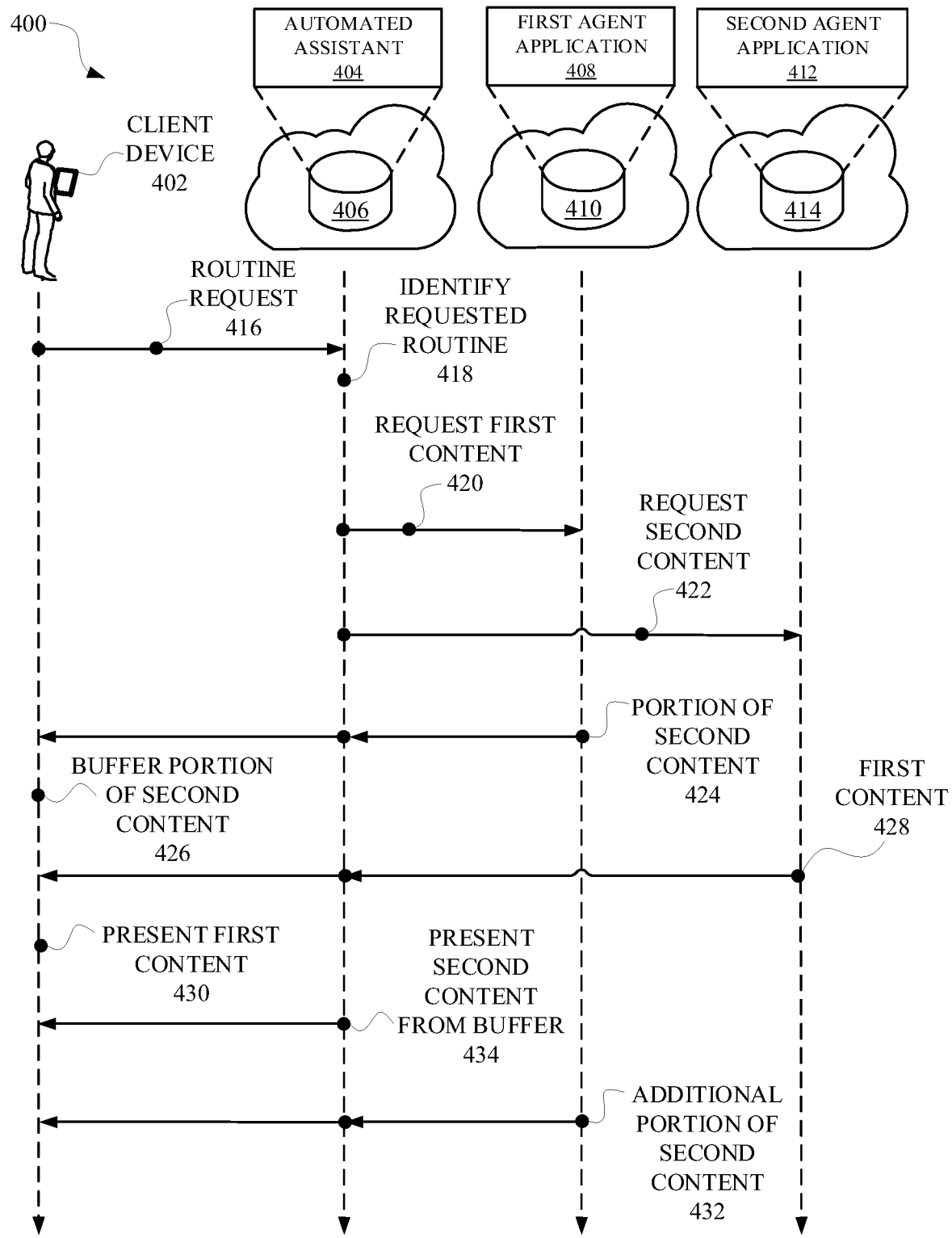
FIG. 4 illustrates a state diagram for buffering content received in furtherance of a multiple action automated assistant routine.

FIG. 4 illustrates a state diagram 400 for buffering content received in furtherance of a routine being performed by an automated assistant. The content can be buffered so that latency between the provisioning of different content during the execution of the routine can be mitigated. For example, a user can be operating a client device 402, such as a cellular phone, tablet device, and/or any other portable electronic device. The client device 402 can include an automated assistant interface, which can operate as an interface between the user and an automated assistant 404 that is at least partially hosted at the client device 402 and/or a remote device 406. The user can provide a natural language input, such as a spoken command for requesting that a routine be performed. A routine can correspond to a combination of actions or tasks that can be executed at the direction of and/or by the automated assistant 404. For instance, the user can provide a spoken command, "Prepare for bedtime," to the automated assistant interface, and in response, the client device 402 can cause a routine request 416 to be transmitted to the remote device 406 for further processing. The automated assistant 404 can identify the requested routine 418, based on a correlation between data associated with the spoken command and data associated with a routine that is stored at the remote device 406. The routine can correspond to actions such as, but not limited to, providing a status of a security alarm at a home of the user and playing a radio station through the client device 402.

When the automated assistant 404 and/or the remote device 406 have identified the routine requested by the user, the automated assistant 404 can identify the actions associated with the routine. For instance, a first action of the routine can include providing a status of a security alarm at the home, which can require the automated assistant 404 to request first content 420 from a first agent application 408 hosted at a remote device 410. Responsive content from the first agent application 408 can indicate a status of the security alarm, and action content transmitted to the client device can cause the client device to render (e.g., audibly and/or graphically) output that indicates the status. A second action of the routine can include playing a radio station, which can require the automated assistant 404 to request second content 422 from a second agent application 412 hosted at a remote device 414.

In some instances, a routine can be configured to require that one action be completed before another action. For example, a routine that requires the automated assistant 404 to retrieve first content and second content can require that the first content be retrieved and presented to the user in full before any second content is provided to the user. However, in order to reduce latency when transitioning between presenting the first content and the second content to the user, the automated assistant 404 can cause the client device 402 to buffer any second content prior to rendering the first content for the user to view or otherwise perceive, and/or after provisioning of the first content to the user. For instance, as provided in FIG. 4, a portion of the second content 424 can be received by the automated assistant 404 prior to the first content 428. In response to the automated assistant 404 receiving the portion of the second content 424 before the first content 428, the automated assistant 404 can cause the client device 402 to buffer the portion of the second content 426. By buffering the portion of the second content 426, the client device 402 would be storing the portion of the second content 426 in one or more memory devices of the client device 102 until the first content 428 is completely provided to the user.

Client device 402 can present the first content 430 in its entirety before presenting the second content from the buffer 434. By having the second content in the buffer, the client device 402 can eliminate latency between presenting the first and second content in furtherance of completing the routine. Thereafter, as additional portions of the second content 432 are received by the automated assistant and/or the client device 402, the client device 402 can quickly stream or buffer the additional content. In this way, rather than waiting for the first content to be presented before requesting the second content, both the first content and the second content can be requested simultaneously, despite the routine being configured such that the first content must be presented completely to the user before presenting the second content.

In some implementations, the first content 428 can be received before the request for second content 422 is transmitted and/or before the portion of the second content 424 is received. As a result, the client device 402 can present the first content 430 before the request for second content 422 is transmitted and/or before the portion of second content 424 is received. Thereafter, the client device 402 can buffer the portion of the second content 426 received, while the client device 402 is rendering the first content 428, or otherwise presenting the first content 430 to the user via the client device 402.

Figure 5:
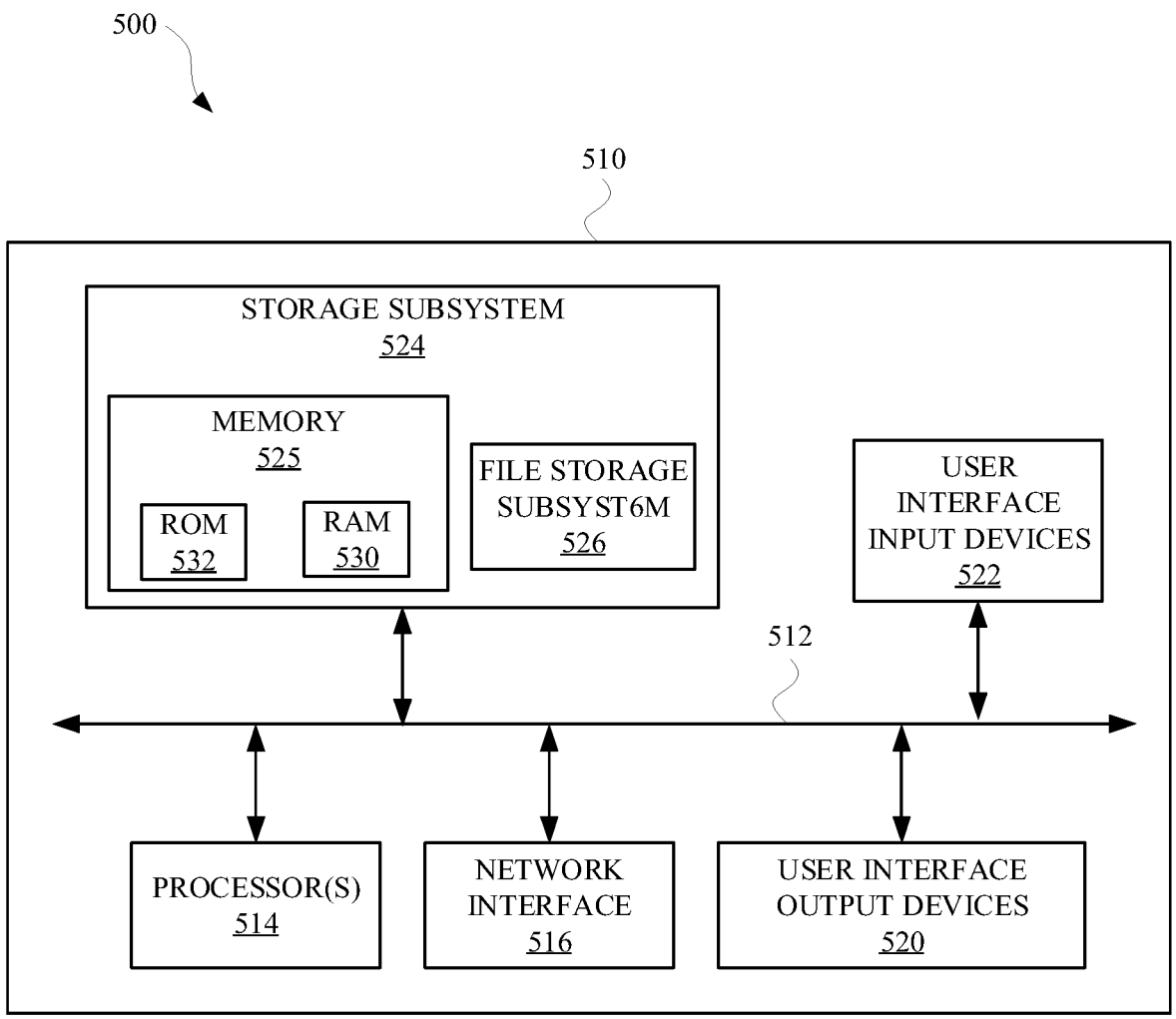
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300 the claims, and/or to implement one or more of a remote device, a client device, a server device, an automated assistant, an agent application, and/or any other system, method, application, or device discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A method, comprising:
   by one or more processors of one or more automated assistant server devices remote from a client device:

receiving, via a network interface, a multiple action request transmitted by the client device;

determining, based on the multiple action request:
- a first automated assistant action that is indicated by the multiple action request, and
- a second automated assistant action that is indicated by the multiple action request, the second automated assistant action being disparate from the first automated assistant action;

generating first action content that is based on the first automated assistant action indicated by the multiple action request;

transmitting, to the client device in response to receiving the multiple action request, the first action content that is based on the first automated assistant action;
- wherein, in response to receiving the transmitted first action content, the client device renders a first output that is based on the first action content;

prior to completion of the rendering of the first output by the client device:
- generating at least part of second action content that is based on the second automated assistant action;
- transmitting, to the client device in response to receiving the multiple action request, the at least part of the second action content that is based on the second automated assistant action;
- wherein the client device receives the at least part of the second action content prior to completion of the rendering of the first output by the client device,
- wherein, in response to receiving the transmitted at least part of the second action content, the client device buffers the at least part of the second action content in local memory of the client device, and
- wherein, in response to completion of rendering of the first output, the client device accesses the at least part of the second action content buffered in the local memory to render second output that is based on the at least part of the second action content.

2. The method of claim 1, wherein: determining the first automated assistant action and the second automated assistant action; generating the first action content; transmitting the first action content; generating the second action content; and transmitting the second action content; are all performed in response to receiving the multiple action request and are all performed prior to receiving any other request transmitted by the client device.

3. The method of claim 1, wherein generating the at least part of the second action content comprises:
- transmitting, to an agent application, an agent request that is based on the second automated assistant action indicated by the multiple action request;
- receiving, from the agent application, a response that is responsive to the agent request; and
- generating the at least part of the second action content based on the response.

4. The method of claim 3, wherein transmitting the agent request causes the agent application to alter a state of a networked peripheral device, wherein the response indicates that alteration of the state was successful, and wherein the at least part of the second action content causes the second output, rendered by the client device, to perceptibly convey to a user of the client device that the alteration of the state was successful.

5. The method of claim 3, wherein the at least part of the second action content is included in the response.

6. The method of claim 1, wherein the first output comprises audio output rendered via one or more speakers of the client device.

7. The method of claim 6, wherein the first action content comprises audio data and wherein the client device renders the first output that is based on the first automated assistant action by driving the one or more speakers based on the audio data.

8. The method of claim 6, wherein the first action content comprises text and wherein the client device renders the first output that is based on the first action content by generating audio data based on processing of the text using a text-to-speech model stored locally on the client device, and providing the generated audio data for rendering of the audio output.

9. The method of claim 1, further comprising:
- establishing a streaming connection with the client device;
- wherein transmitting the first action content is via the streaming connection; and
- wherein transmitting the at least part of the second action content is via the streaming connection.

10. The method of claim 1, wherein the multiple action request comprises audio data that corresponds to a spoken utterance detected at the client device and further comprising:
- processing the audio data of the multiple action request to convert the audio data to text;
- wherein determining the first automated assistant action and the second automated assistant action based on the multiple action request comprises:
  - determining the first automated assistant action and the second automated assistant action are both mapped to: the text, and to an identifier of the client device.

11. The method of claim 1, wherein determining the first automated assistant action and the second automated assistant action based on the multiple action request further comprises determining that the multiple action request dictates that the first automated assistant action is to be performed prior to the second automated assistant action, and wherein transmitting the first action content occurs prior to transmitting the at least part of the second action content based on the multiple action request dictating that the first automated assistant action is to be performed immediately prior to the second automated assistant action.

12. The method of claim 1, wherein generating the first action content that is based on the first automated assistant action comprises:
- generating a first portion of the first action content prior to completion of generating a second portion of the first action content; and
- wherein transmitting the first action content that is based on the first automated assistant action comprises:
  - based on determining that the first portion of the first action content is immediately renderable by the client device, transmitting the first portion of the first action content prior to completion of generating the second portion; and
  - transmitting the second portion after completion of generating the second portion.

13. The method of claim 12, wherein the first portion comprises a first segment of audio data or text and the second portion comprises a second segment of audio data or text.

14. The method of claim 13, wherein the first portion comprises a graphical interface with at least one display variable, and wherein the second portion defines a value for the at least one display variable.

15. A method, comprising:
   transmitting, by a client device, a multiple action request to a system of one or more automated assistant server devices;
   receiving, by the system, the multiple action request transmitted by the client device;
   determining, by the system and based on the multiple action request, a first automated assistant action that is indicated by the multiple action request, and a disparate second automated assistant action that is indicated by the multiple action request;
   generating, by the system, first action content that is based on the first automated assistant action;
   transmitting, by the system, the first action content that is based on the first action;
   receiving, by the client device, the first action content;
   rendering, by the client device in response to receiving the first action content, first output that is based on the first action content;
   prior to completion of the rendering of the first output by the client device:
      generating, by the system, second action content that is based on the second automated assistant action;
      transmitting, by the system, the second action content that is based on the second automated assistant action; and
      receiving, by the client device, the second action content;
      buffering, by the client device in local memory of the client device, the second action content;
   by the client device in response to completion of the rendering of the first output:
      rendering second output that is based on the second action content buffered in the local memory.

16. The method of claim 15, wherein the first action content comprises audio data and wherein rendering the first output that is based on the first action content comprises driving one or more speakers of the client device based on the audio data.

17. The method of claim 15, wherein the first action content comprises text and wherein rendering the first output that is based on the first action content comprises generating audio data based on processing of the text using a text-to-speech model stored locally on the client device, and providing the generated audio data for rendering of the audio output via one or more speakers of the client device.

18. A method implemented by one or more processors, the method comprising:
   generating a routine that includes multiple different actions, wherein the multiple different actions include an action that an automated assistant is configured to perform in response to receiving a natural language input at an automated assistant interface of a client device;
   receiving, from the client device, a request to perform the routine, wherein the multiple different actions include providing, via the automated assistant interface, first content responsive to a first action, of the multiple actions, where the first content is accessible via a first agent application and second content responsive to a second action, of the multiple actions, where the second content is accessible via a second agent application;
   initializing retrieval of the first content from the first agent application and the second content via the second agent application;
   receiving a portion of the first content from the first agent application prior to receiving a portion of the second content from the second agent application;
   causing the automated assistant to provide an output stream via the automated assistant interface, wherein the output stream includes the portion of the first content; and
   when the portion of the second content is received concurrently with the automated assistant providing the output stream that includes the portion of the first content:
      causing the automated assistant to:
         incorporate the portion of the second content responsive to the second action into the output stream prior to the automated assistant completely provisioning the first content responsive to the first action.

19. The method of claim 18, wherein causing the automated assistant to incorporate the portion of the second content includes causing the automated assistant to provide a prompt to a user via the automated assistant interface.

20. The method of claim 19, further comprising:
   when the portion of the second content is received concurrently with the automated assistant providing the output stream that includes the portion of the first content:
      causing the automated assistant to provide a remaining portion of the first content via a separate automated assistant interface of the client device, wherein the automated assistant interface and the separate automated assistant interface correspond to different subsystems of the client device.

* * * * *